Jan. 17, 1933.   H. WEICHSEL   1,894,804
ALTERNATING CURRENT MOTOR
Filed March 1, 1930
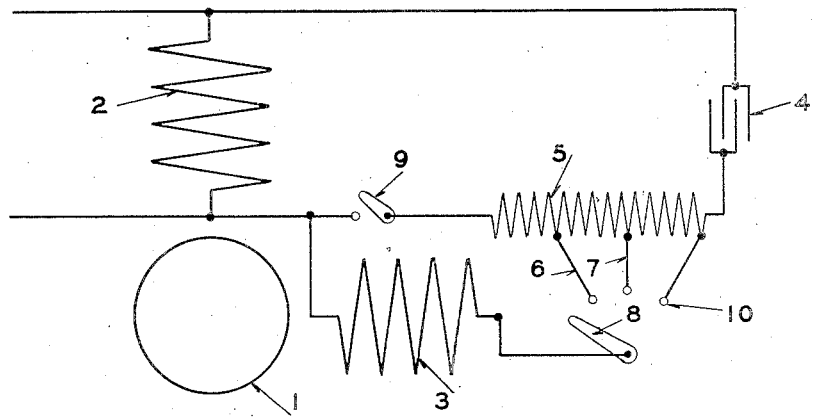
Inventor
H. WEICHSEL
By E. E. Huffman
Att'y.

Patented Jan. 17, 1933

1,894,804

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed March 1, 1930. Serial No. 432,357.

In split phase motors of the condenser type the relations between the turns of the main inducing winding and the auxiliary inducing winding, and the condenser values, most suitable for normal operation, do not produce a sufficiently high starting torque for all purposes and this difficulty cannot be satisfactorily overcome by providing the auxiliary winding with excess turns employed only during the starting operation because not only would an undesirably high voltage exist across the turns of such an auxiliary winding during running, but such starting turns necessitate increased winding space. It is the object of my invention to procure the desired starting and running ampere turn ratios between the main and auxiliary inducing windings without change in the actual number of turns in the auxiliary winding.

The accompanying drawing diagrammatically illustrates a motor embodying my invention. The rotor 1 is provided with a short-circuited winding, usually of the squirrel-cage type, and the stator with a main inducing winding 2 and an auxiliary inducing winding 3 displaced preferably 90 electrical degrees therefrom. This auxiliary winding is in a phase displacing circuit connected to the line in parallel with the main inducing winding and comprising a condenser 4. In accordance with my invention a current transformer 5 is provided, this transformer being preferably of the auto transformer type, and having taps 6 and 7 by means of which and switch 8, a variable number of turns of the transformer may be connected in parallel with the auxiliary inducing winding when switch 9 is closed, the circuits being so arranged that closing this latter switch connects the transformer to the line in series with the condenser.

The capacity of the condenser and the ratio of the actual number of turns in the main inducing winding to those in the auxiliary winding are selected as desired for normal operation of the motor, and to start the machine switch 9 is closed and switch 8 engaged with the tap 6 of the transformer whereby, for example, one-fourth only of the turns of the transformer are connected in parallel with the auxiliary winding.

If it be assumed that a current of one ampere flows through the transformer, the value of the current through the auxiliary winding would, therefore, be four amperes. After the motor has started, switch 8 may be moved to tap 7 to reduce the current through the auxiliary winding and when normal speed is attained it is preferably moved to contact 10, whereby the transformer no longer influences the current through the auxiliary winding.

While such is not essential, I prefer to have the switch 9 open during normal operation since the transformer would otherwise draw a slight magnetizing current which would unfavorably affect the power factor of the machine.

Having fully described my invention, what I claim as new and desire to secure by Letters Patent of the United States is:

1. In an alternating current motor, an induced member, an inducing member provided with a main inducing winding and with an auxiliary winding displaced therefrom, a phase displacing circuit comprising a capacity and a current transformer and means independent of the auxiliary winding for impressing on said phase displacing circuit an E. M. F. derived from the line, said current transformer having its secondary in circuit with the auxiliary inducing winding for starting the motor and being so dimensioned that the current in said secondary circuit exceeds the current in the phase displacing circuit.

2. In an alternating current motor, an induced member, an inducing member provided with a main inducing winding and with an auxiliary winding displaced therefrom, a phase displacing circuit comprising a capacity and a current transformer, and means independent of the auxiliary winding for impressing on the phase displacing circuit a voltage substantially co-phasal with the voltage impressed on the main inducing winding, said current transformer having its secondary in circuit with the auxiliary inducing winding for starting the motor and being so dimensioned that the current in said secondary circuit exceeds the current in the phase displacing circuit.

3. In an alternating current motor, an induced member, an inducing member provided with a main inducing winding and with an auxiliary inducing winding displaced therefrom, a phase displacing circuit comprising a capacity and a current transformer connected in series across the line, and means for connecting the auxiliary inducing winding in circuit with the secondary of said current transformer.

4. In an alternating current motor, an induced member, an inducing member provided with a main inducing winding and with an auxiliary inducing winding displaced therefrom, a phase displacing circuit connected to the line in parallel with the main inducing winding and comprising a condenser and a single coil transformer, and means for connecting the auxiliary winding at starting in shunt with a portion only of the turns of said transformer.

5. In an alternating current motor, an induced member, an inducing member provided with a main inducing winding and with an auxiliary winding displaced therefrom, a phase displacing circuit, means independent of the auxiliary winding for impressing on said phase displacing circuit an E. M. F. derived from the line, and means including an element of the phase displacing circuit for causing the current through the auxiliary winding to have a different value at starting than the current through said phase displacing circuit.

6. In an alternating current motor, an induced member, an inducing member provided with a main inducing winding and with an auxiliary winding displaced therefrom, a phase displacing circuit, means independent of the auxiliary winding for impressing on said phase displacing circuit an E. M. F. derived from the line, and means including an element of the phase displacing circuit for causing the current through the auxiliary winding to have a higher value at starting than the current through said phase displacing circuit.

In testimony whereof, I hereunto affix my signature, this 24th day of February, 1930.

HANS WEICHSEL.